United States Patent [19]

Chung

[11] 4,244,596
[45] Jan. 13, 1981

[54] STEERING CONTROLLING APPARATUS FOR TRAILERS

[76] Inventor: Tae D. Chung, 200, Eubnae-ri, Gwangyang-eub, Gwangyang-gun, Jeonra-namdo, Rep. of Korea

[21] Appl. No.: 7,634

[22] Filed: Jan. 29, 1979

[51] Int. Cl.³ ............................................. B62D 13/04
[52] U.S. Cl. ................................... 280/426; 280/442
[58] Field of Search ............... 280/442, 426, 419, 408

[56] References Cited

U.S. PATENT DOCUMENTS

| 1,880,123 | 9/1932 | Davis et al. | 280/408 |
|---|---|---|---|
| 3,533,644 | 10/1970 | Humes | 280/426 |

FOREIGN PATENT DOCUMENTS 430469 8/1967 Switzerland ............................ 280/426

Primary Examiner—John A. Pekar

Attorney, Agent, or Firm—Blanchard, Flynn, Thiel, Boutell & Tanis

[57] ABSTRACT

A steering controlling apparatus for an articulated truck-trailer combination, wherein the front and rear ends of the trailer have front and rear rotatable steering transmitting plates thereon which are joined together by a crossed cable arrangement so that rotation of the front plate causes a corresponding rotation of the rear plate in the opposite direction. The rear plate is coupled to the rear axle assembly to cause corresponding horizontal angular displacement thereof. The front steering transmitting plate is coupled to the rear coupling plate of the truck such that the front steering transmitting plate is rotated relative to the trailer whenever the truck is turned, at least up to a maximum angular extent, to cause corrective steering of the rear axle unit so that it will approximately trace and follow the same path as the truck when turning.

5 Claims, 28 Drawing Figures

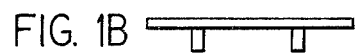
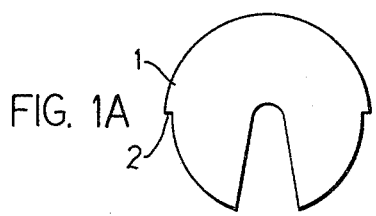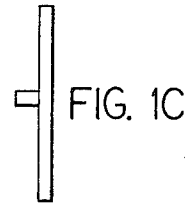
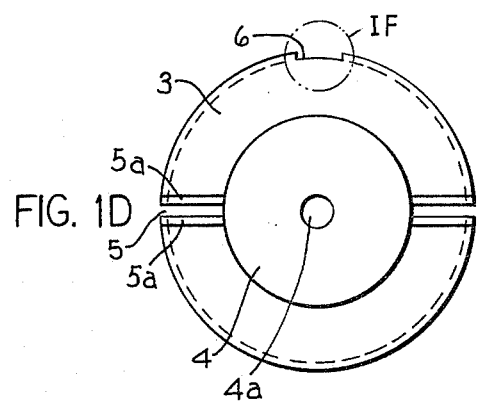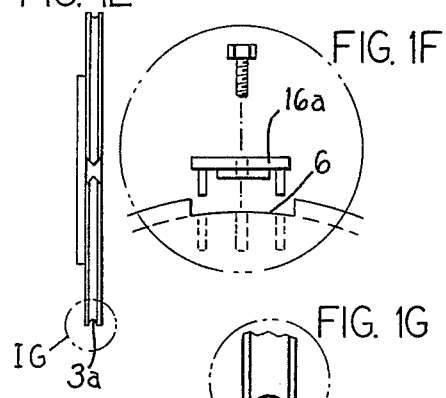
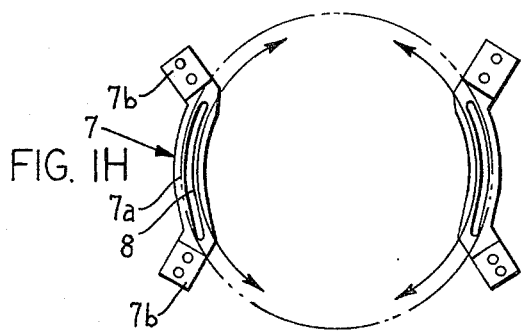
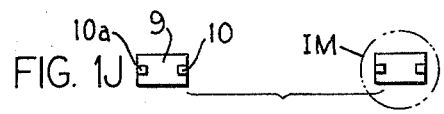
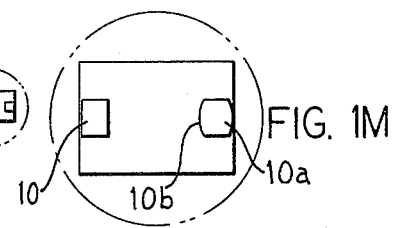

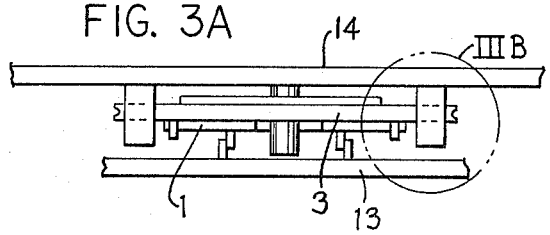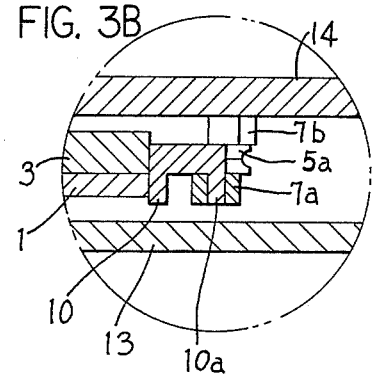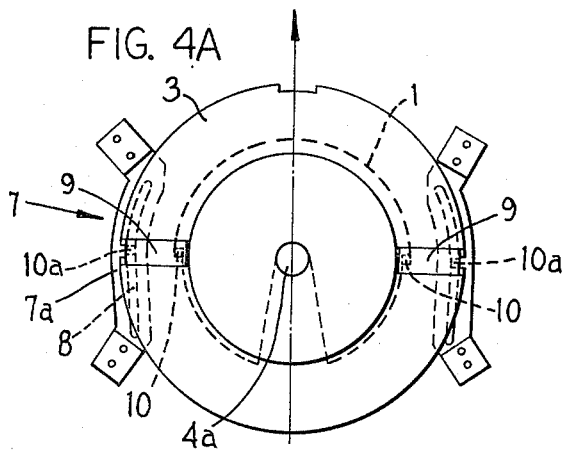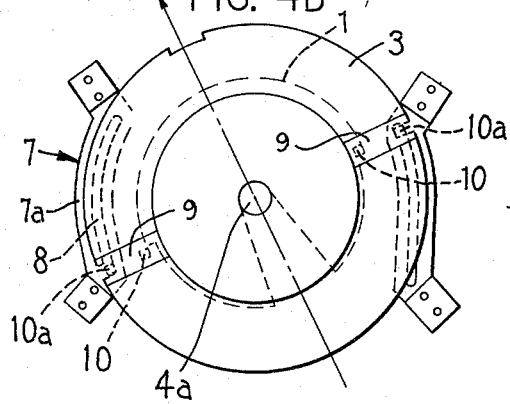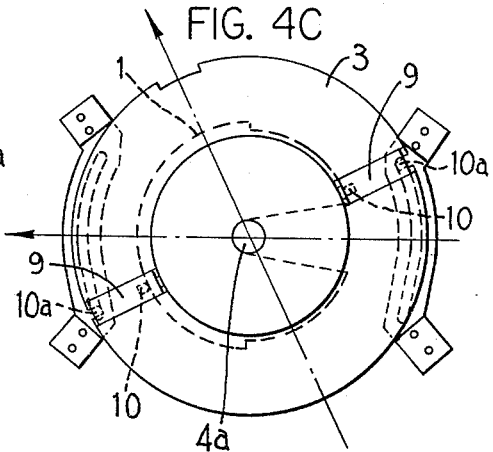

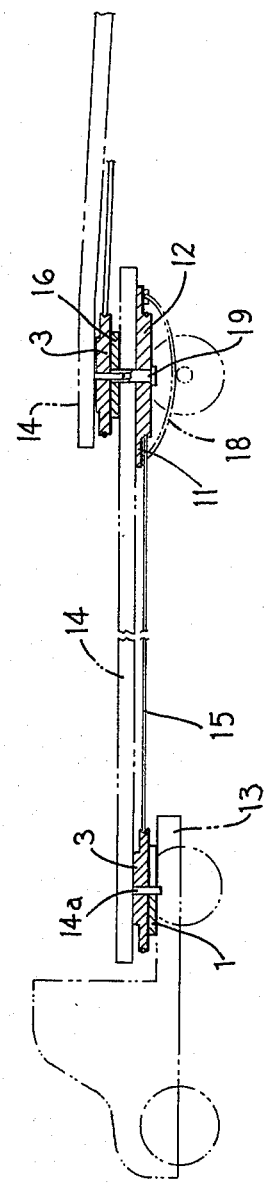

STEERING CONTROLLING APPARATUS FOR TRAILERS

BACKGROUND OF THE INVENTION

The present invention relates to a steering controlling apparatus for trailers transporting freight. Recently, large trailers have been developed, but the recently developed large trailers still have disadvantages in case of running on the narrow or very curved roads, and trains (freight trains) must run on rails only which requires unloading to trucks or trailers for the purpose of transporting freight to other locations.

The present invention is to provide a steering controlling apparatus for trailers which makes trailers able to run like a freight train even in town or on narrow roads by means of making all the wheels of the trailers connected by the steering controlling apparatus of the invention capable of running on the wheel trace of the tractor, such as with a train.

BRIEF DESCRIPTION OF THE DRAWINGS

FIG. 1 illustrates the various parts of the steering controlling apparatus of the present invention in a separated condition, and specifically FIG. 1A is a plan view of the round coupling plate adapted to be mounted on the tractor, FIG. 1B is a back view of FIG. 1A, FIG. 1C is a side view of FIG. 1A, FIG. 1D is a plan view of the steering transmitting plate, FIG. 1E is a side view of FIG. 1D, FIG. 1F is an exploded enlarged view of the parts associated with the circle IF shown in FIG. 1D, FIG. 1G is an enlargement of the portion shown within the circle IG of FIG. 1E, FIG. 1H is a plan view showing the glider which supports the steering energy transmitting plate, FIG. 1I is a side view of FIG. 1H, FIG. 1J is a plan view of the operators, FIG. 1K is a front view of FIG. 1J, FIG. 1L is a side view of FIG. 1K, and FIG. 1M is an enlargement of the operator as shown in the circle IM in FIG. 1J.

FIG. 3A is a fragmentary elevational view showing the state of the coupling plate and steering transmitting plate as mounted on a tractor and trailer, respectively, with FIG. 3B being an enlarged partial sectional view showing the portion within the circle designated IIIB in FIG. 3A.

FIGS. 4A—4C are plan views showing various positions accordingto the angles of steering, wherein FIG. 4A is a view for running straight, FIG. 4B is a view for running at an angle of 30°, and FIG. 4C is a view for running at an angle of 90°.

FIGS. 8A—8E are diagrammatic views showing the states of the running of a conventional trailer and the running of trailers connected like a train by apparatus of the present invention, wherein FIG. 8A is a view of the wheel trace of a conventional trailer, FIG. 8B is a view of the wheel trace made by one trailer connected by apparatus of the present invention, FIG. 8C shows the steering possibility of trailers connected by apparatus above, FIG. 8D is a view showing the steering of wheels when a train of trailers connected by the steering controlling apparatus of the present invention is turned, and FIG. 8E is a view showing the state of steering of wheels of a train of trailers connected by the steering controlling apparatus of the invention when run on a curved road.

FIG. 9 is a side elevational view of an embodiment of the invention.

DETAILED DESCRIPTION

Figure 2:
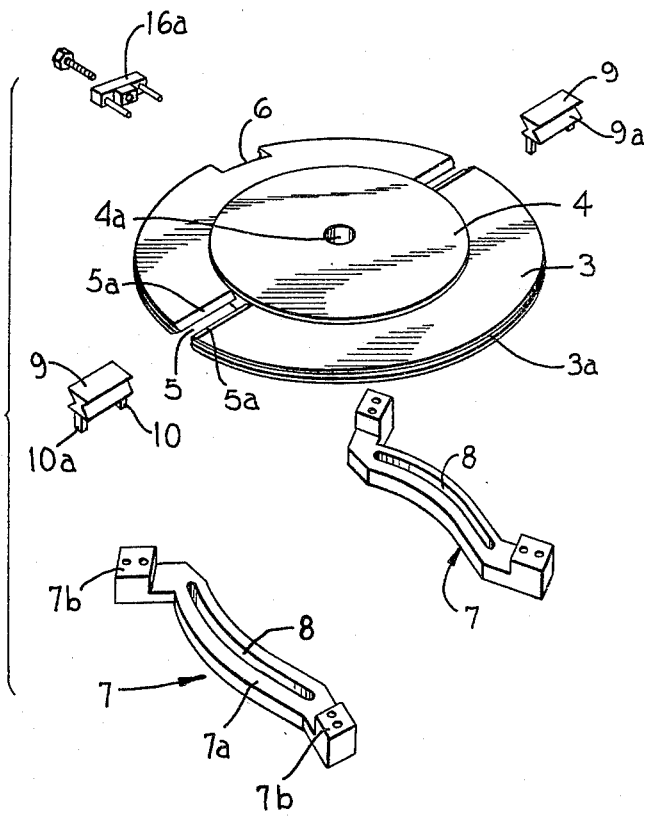
FIG. 2 is an exploded perspective view of the various parts shown in FIG. 1.
Figure 5:
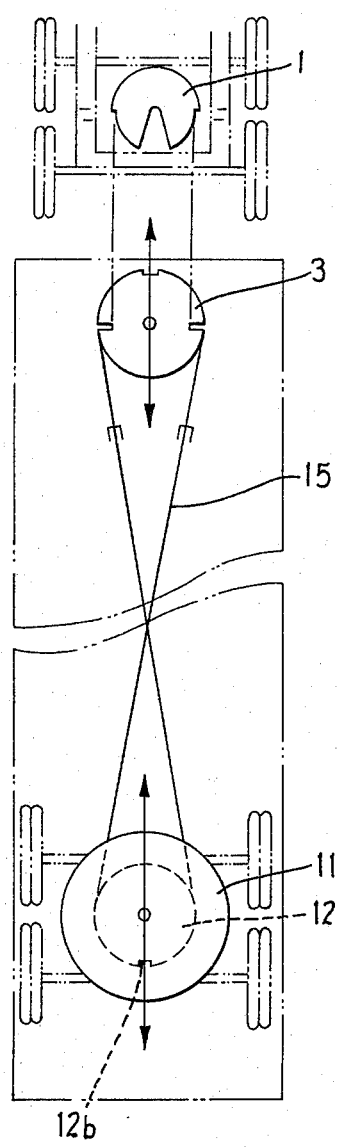
FIG. 5 is an exploded plan view showing the operator projections which are positioned at the pushing parts of the coupling round plate when running straight.

Now explaining the structures of the present invention according to the drawings, round plate (coupling round plate) 1 is formed with pushing parts or shoulders 2 at both sides on the center line of the round shape plate as shown in FIG. 1 thereby forming the small semi circle and large semi circle. The steering energy transmitting plate 3 is formed to be larger than the said coupling round plate 1 and the wire guiding groove 3a is formed around the circumferential face of said plate 3 and the annular projection 4 which is the same size as the diameter of said small semic circle as shown in FIG. 1A is at the middle part of said plate 3, and the hole 4a is made at the center of said plate 3 for the shaft, and grooves 5 are made at both end parts on the center line of said plate 3 and said grooves 5 have downwardly and upwardly inclined faces for guiding the operators 9 face to face as shown in FIG. 1E. The wire fixing part 6 is formed at the front end on the center line of said plate 3 as shown in FIG. 1D. The guider 7 is fixed to the trailer base 14 and has an elongated slot 8 therein, the front part of which is straight and rear part of which is slightly curved as shown in FIG. 2, and said guider 7 itself is slightly curved accordingly as the groove 8, and fixing part 7b is formed at both end parts of the center body 7a of said guider 7. The operators 9 are made with a V-shaped groove 9a at both sides of said operators 9 as shown in FIG. 2, and the rod shaped projections 10 and 10a are made at both end parts of the bottom of said operators 9 respectively, and each projection 10a is formed with a round face 10b at it's both side faces as shown in FIG. 1D. The steering energy transmitting rotary plate 11 (FIGS. 5—7) is made so that the diameter of said plate 11 is greater than the diameter of said steering energy transmitting plate 3. The plate 11 has a round projection 12 at the middle part thereof, a wire guiding groove 12a is formed along the circumferential face of said round projection 12, and a wire fixing part 12b is formed at the rear end part on the center line of said round projection 12 as shown in FIG. 5.

Figure 6:
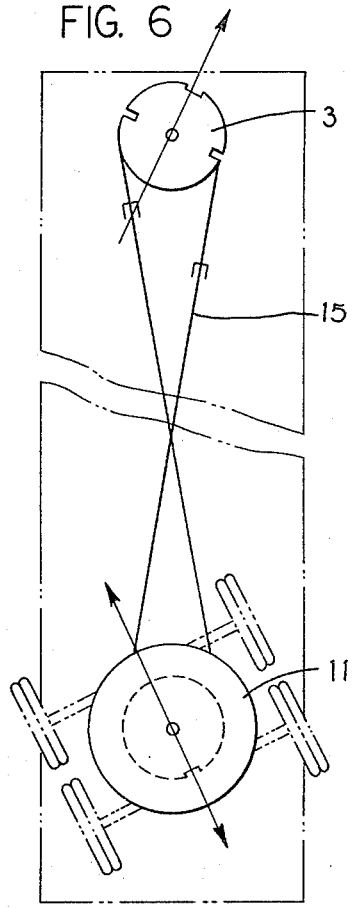
FIG. 6 is a plan view wherein the steering energy is transmitted to the trailer when running at an angle of 30°.
Figure 7:
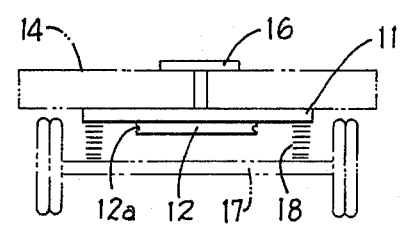
FIG. 7 is an elevational view showing the coupling of the round plate and steering energy transmitting rotary plate as mounted at the rear part of a trailer.

Explaining the action of the present invention according to the drawings, the coupling round plate 1 is mounted on the rear 13 (FIG. 9) of a track as in conventional by means of a shaft type universal joint, and said coupling round plate 1 is mounted as to be declined on all sides as the conventional coupling. The steering energy transmitting plate 3 is mounted on the shaft 14a set at the front part of the bottom of the base 14 of the trailer, and the steering energy transmitting rotary plate 11 is mounted on the shaft 19 at the rear part of the bottom of the base 14 of the trailers. At the same time, the other coupling round plate 16 which is the same as the said coupling round plate 1 is mounted on the upwardly projecting part of the shaft 19. The steering energy transmitting plate 3 and the steering energy transmitting rotary plate 11 are connected by the wire 15 so as to be rotated in the opposite direction by means of setting the wire 15 along the guiding grooves 3a, 12a as shown in FIGS. 5 and 6, and the operators 9 are positioned within the grooves 5 of the said plate 3 respectively so that the projections 10, 10a are downward as shown in FIG. 3. The outer projections 10a of the said operators 9 are placed in the guiding grooves 8 of the said guider 7 and the body 7a of the said guider 7 keeps slidable contact with the said steering energy transmitting plate's face as shown in FIGS. 1, 3, 4. The guider 7 is fixed to the bottom of the trailer by fixing part 7b of said guider 7 as shown in FIG. 3. The operators 9 effect transfer of rotary movements between the both side faces of said coupling round plate 1 and said steering energy transmitting plate 3. Both end parts of said wire 15 are put into the fixing part 6 formed at the front end part of said steering energy transmitting plate 3 and said both end parts of said wire 15 are fixed to said fixing part 6 by the fixer 16a (FIG. 2). The springs 18 (FIG. 7) are connected with the shaft or axle 17 and with the said steering energy transmitting rotary plate 11 so as said shaft 17 is horizontally rotated by the action of turning of said plate 11. The present invention permits many trailers to be coupled like a train by using the apparatus of the present invention.

When the face of said steering energy transmitting plate 3 is set to the shaft so as to be contacted with the upper surface of said coupling round plate 1 the outer projections 10a of said operators 9 are positioned at the middle part of said guiding slots 8 of said guiders 7 and said inner projections 10 of said operators 9 are positioned at the shoulder 2 as shown in FIG. 4A, when running straight, and then said steering energy transmitting plate 3 does not rotate, but, as shown in FIG. 4B, in case running at an angle of 30 degrees, the outer projection 10a of one operator 9 is positioned at the end of the straight guiding part of said guiding slot 8 and the inner projection 10 is freed from the shoulder 2, and the outer projection 10a of the other operator 9 is positioned at the end of the curved part of said guiding slot 8 as shown in FIG. 4B, and the inner projection 10 of said other operator 9 is moved along the circumferential face of the small semi circle of said coupling round plate 1. Thereafter, because the inner projection 10 of said one operator 9 is spaced outwardly from the shoulder 2, said coupling round plate 1 can be rotated freely without rotating said steering energy transmitting plate 3 in case said plate 1 is rotated beyond an angle of 30 degree. In case of unnatural steering, parts of the apparatus of the present invention are thus protected.

Accordingly, as said steering energy transmitting rotary plate 11 as connected by said wire 15 is rotated at an angle of same degree as said plate 3 but in opposite direction by the action of rotation of said plate 3, the wheel shaft 17 fixed to the said plate 11 acting through said spring 18 can be turned and then can run on the same trace on which the tractor ran. All of the trailers coupled like a train thus run on the same trace mentioned above.

As shown in FIG. 8, the direction of each trailer is steered in opposite directions at the same angle by the action of the apparatus of the present invention.

Figure 8A:
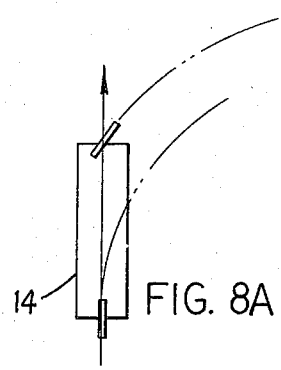
Figure 8B:
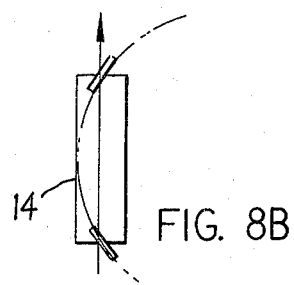
Figure 8C:
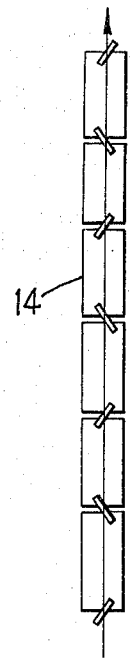
Figure 8D:
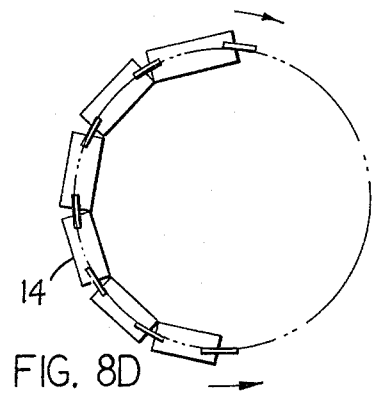
Figure 8E:
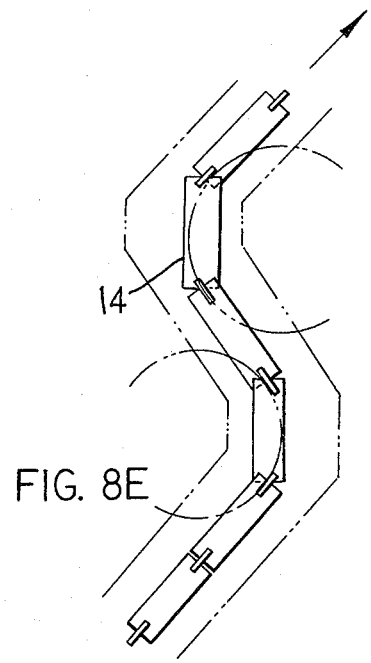

FIG. 8D is an imaginary drawing in case the tractor and trailers run in a circle, and FIG. 8E is an imaginary drawing in case of running on a road having curves. And the action is the same when going forward or backward.

I claim:

1. In an articulated truck-trailer combination having a steering control apparatus connected between the truck and the trailer for causing the trailer to approximately follow the path of the truck during turning, the improvement wherein said steering control apparatus comprises:
   a first coupling device mounted on said truck and having a pair of substantially diametrically opposite projecting parts;
   said first coupling device including an annular coupling plate having front and rear opposed semicircular parts which are of different diameters, the front part being of greater diameter than the rear part so that the intersection of said two parts define a pair of shoulders located on diametrically opposite sides of said coupling plate, said shoulders defining said projecting parts;
   a second coupling device mounted on said trailer adjacent the forward end thereof and being pivotally connectible to said first coupling device for joining said truck and trailer together, said second coupling device including a first steering transmitting plate mounted for horizontal angular displacement relative to the trailer bed;
   said first steering transmitting plate having a pair of diametrically opposite slots formed therein and extending radially thereof, said slots being disposed on a diametrically extending line which extends substantially perpendicular to the longitudinally extending direction of the trailer when the truck-trailer combination is traveling along a straight path;
   operator means mounted on said second coupling device and being engageable with said projecting parts for causing horizontal angular displacement of said first steering transmitting plate relative to said trailer bed in response to rotation of said first coupling device due to turning of said truck relative to said trailer;
   said operator means including slide members slidably disposed within said slots and having projecting portions thereon disposed adjacent the periphery of said coupling plate for engagement with said shoulders;
   a second steering transmitting plate mounted on said trailer adjacent the rear end thereof, said second steering transmitting plate being mounted for horizontal angular displacement relative to said trailer bed, said trailer having a rear axle assembly connected to said second steering plate so as to be horizontally angularly displaceable therewith relative to said trailer bed; and
   cable means connected between said first and second steering transmitting plates for horizontally angularly displacing said second steering transmitting plate and said axle assembly in one direction in response to horizontal angular displacement of said first steering transmitting plate in the opposite direction.

2. A combination according to claim 1, including disconnection means coacting with said opertor means for causing the projections associated with said slie members to be disengaged from said shoulders when the horizontal angular displacement of said coupling plate relative to said trailer bed exceeds a predetermined angle.

3. A combination according to claim 2, wherein said disconnection means includes a pair of elongated guide members fixed to said trailer and disposed adjacent said first steering transmitting plate, said elongated guide members each having elongated guide means associated therewith, and each of said slides having a guide portion slidably engaged with said elongated guide means for controlling the radial slidable displacement of the respective slide relative to said first steering transmitting plate in response to angular displacement of the latter.

4. A combination according to claim 1, wherein a second trailer has the front end thereof hingedly connected to the rear end of said first-mentioned trailer, and a further said steering control apparatus associated with said second trailer and the rear part of said first trailer for causing horizontal angular displacement of the rear axle assembly of said second trailer.

5. In an articulated truck-trailer combination having a steering control apparatus connected between the truck and the trailer for causing the trailer to approximately follow the path of the truck during turning, the improvement wherein said steering control apparatus comprises:

- a first coupling device mounted on said truck and including an annular coupling plate having front and rear opposed partial circular parts which are of different diameters, the front part being of greater diameter than the rear part so that the intersection of said two parts define a pair of shoulders located on opposite sides of said coupling plate;
- a second coupling device mounted on said trailer adjacent the forward end thereof and being pivotally connectible to said first coupling device for joining said truck and trailer together, said second coupling device including a first steering transmitting plate mounted for horizontal angular displacement relative to the trailer bed, said first steering transmitting plate having a pair of opposed slots formed therein and extending radially thereof, said slots extending transversely relative to the longitudinally extending direction of the trailer when the truck-trailer combination is traveling along a straight line;
- operator means mounted on said second coupling device and being engageable with said shoulders for causing horizontal angular displacement of said first steering transmitting plate relative to said trailer bed in response to rotation of said first coupling device due to turning of said truck relative to said trailer, said operator means including slide members slidably disposed within said slots and having projecting portions thereon disposed adjacent the periphery of said coupling plate for engagement with said shoulders;
- disconnection means coacting with said operator means for causing the projections on said slide members to be disengaged from said shoulders when the horizontal angular displacement of said coupling plate relative to said trailer bed exceeds a predetermined angle, said disconnection means including a pair of elongated guide cams fixed to said trailer and disposed adjacent said first steering transmitting plate, said guide cams being disposed in slidable engagement with said slide members for controlling the radial position thereof;
- a second steering transmitting plate mounted on said trailer adjacent the rear end thereof, said second steering transmitting plate being mounted for horizontal angular displacement relative to said trailer bed, said trailer having a rear axle assembly connected to said second steering plate so as to be horizontally angularly displaceable therewith relative to said trailer bed; and
- elongated flexible motion transmitting means connected between said first and second steering transmitting plates for horizontally angularly displacing said second steering transmitting plate and said axle assembly in one direction in response to horizontal angular displacement of said first steering transmitting plate in the opposite direction.

* * * * *